Nov. 20, 1951     V. YAGER ET AL     2,575,902
AIR VENT AND FOCUSING SCREEN SUPPORT
FOR BELLOWS TYPE CAMERAS
Filed June 26, 1947     5 Sheets-Sheet 2
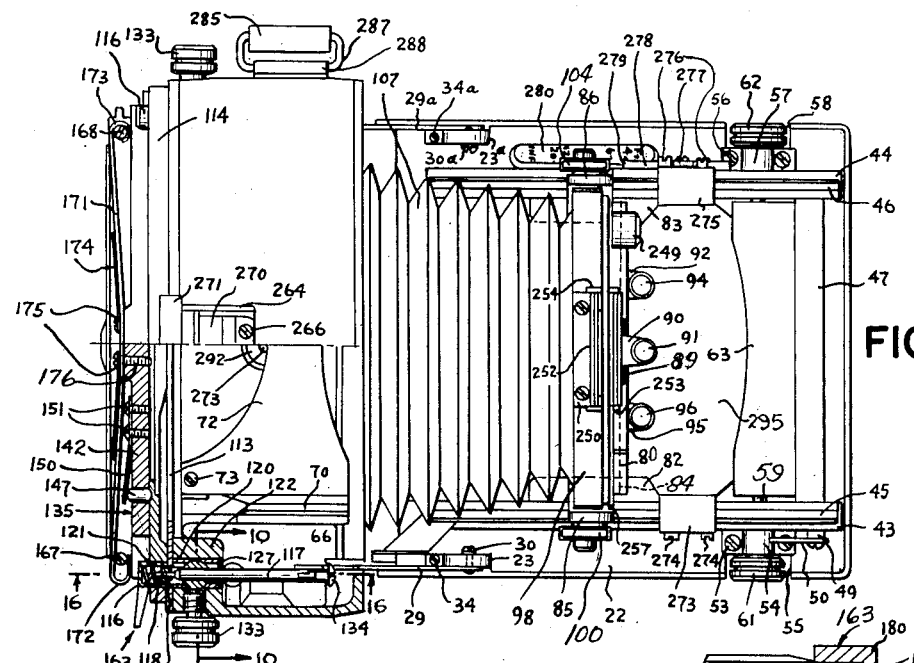
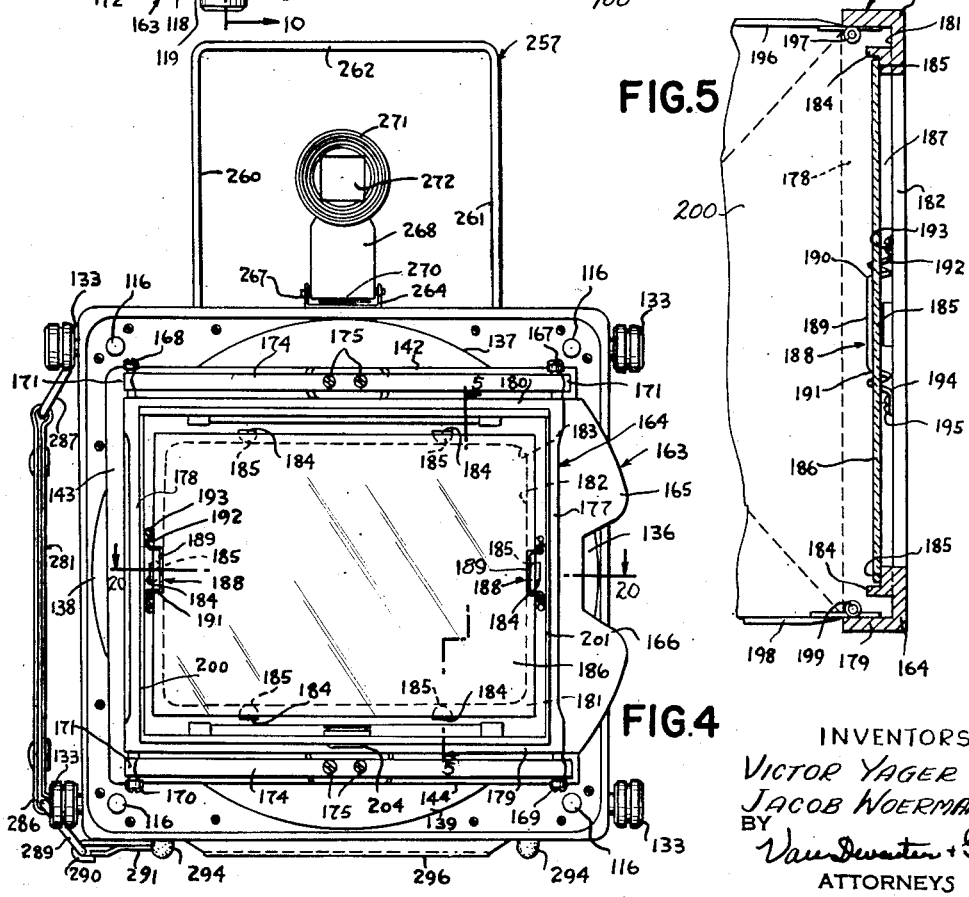
INVENTORS
VICTOR YAGER
JACOB NOERMANN
BY
ATTORNEYS Nov. 20, 1951 V. YAGER ET AL 2,575,902
AIR VENT AND FOCUSING SCREEN SUPPORT
FOR BELLOWS TYPE CAMERAS
Filed June 26, 1947 5 Sheets-Sheet 3

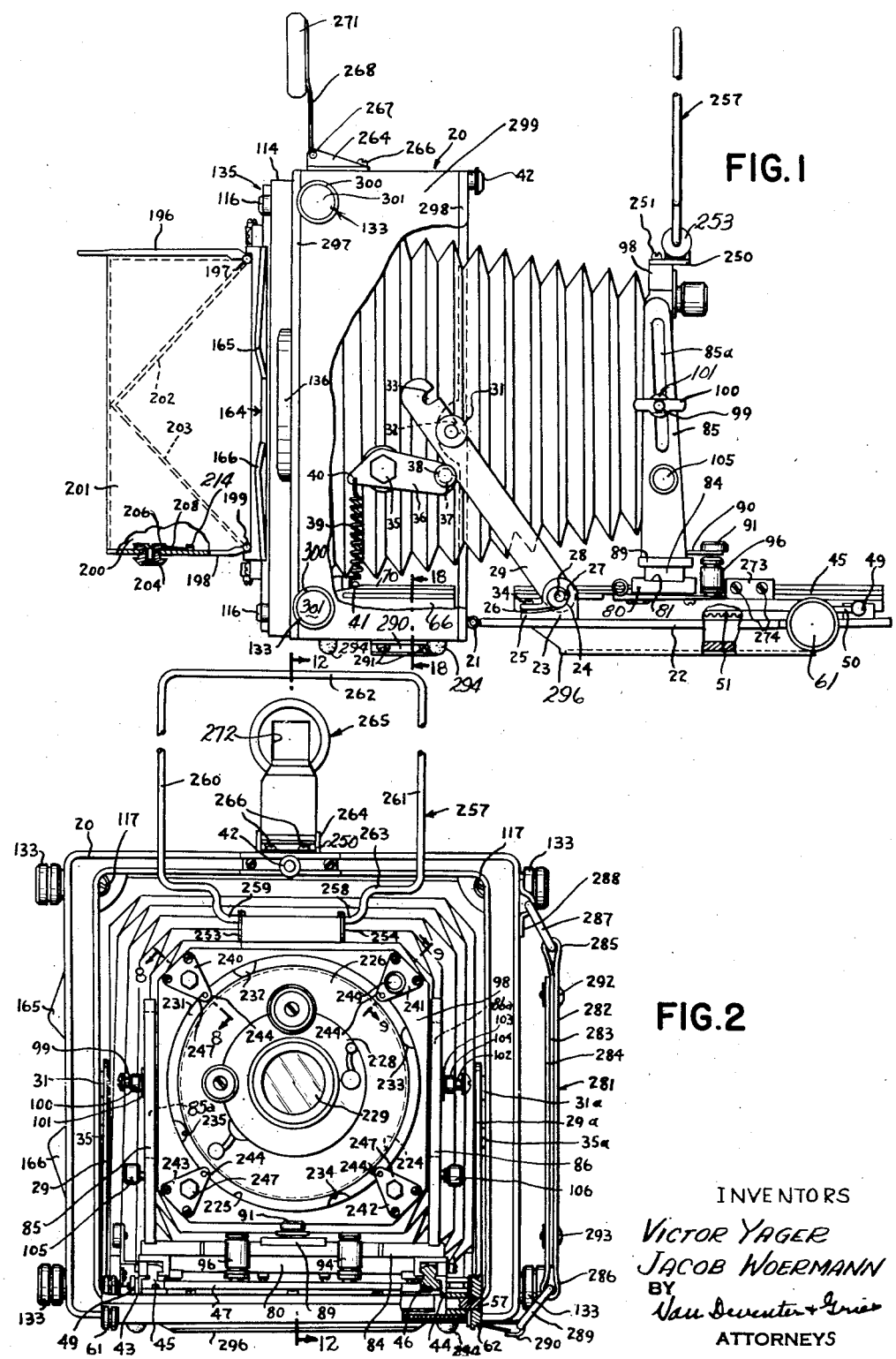

INVENTORS
VICTOR YAGER
JACOB WOERMANN
BY
Van Deventer & Grier
ATTORNEYS

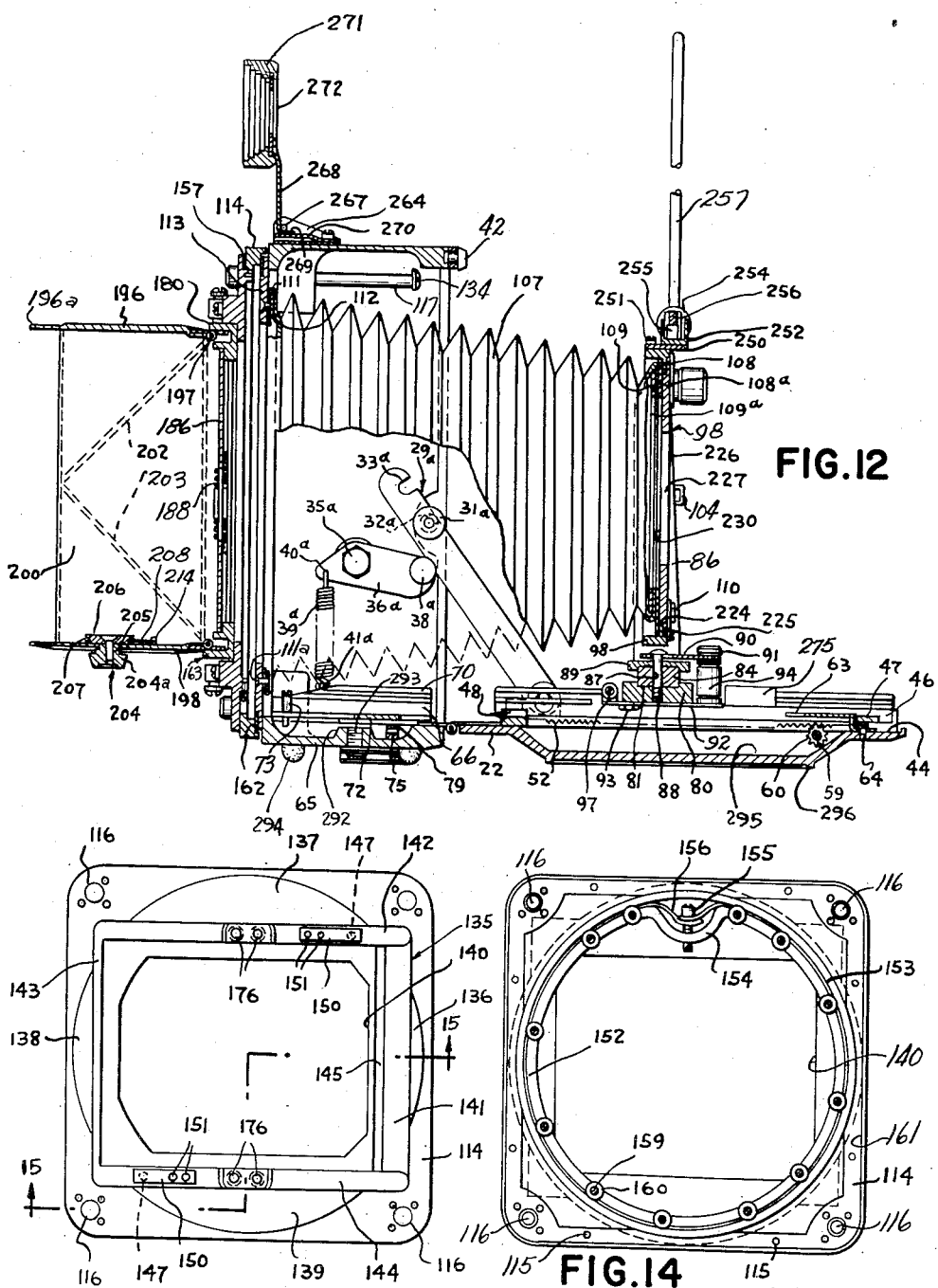

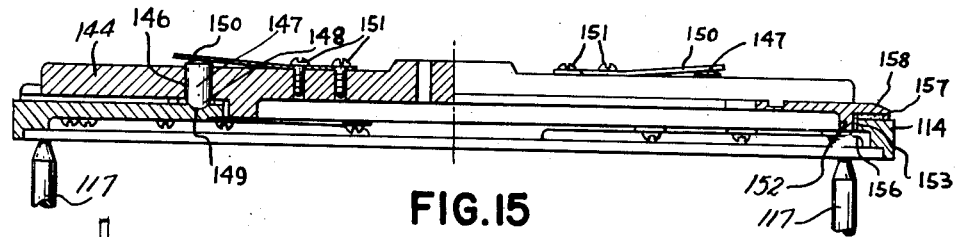
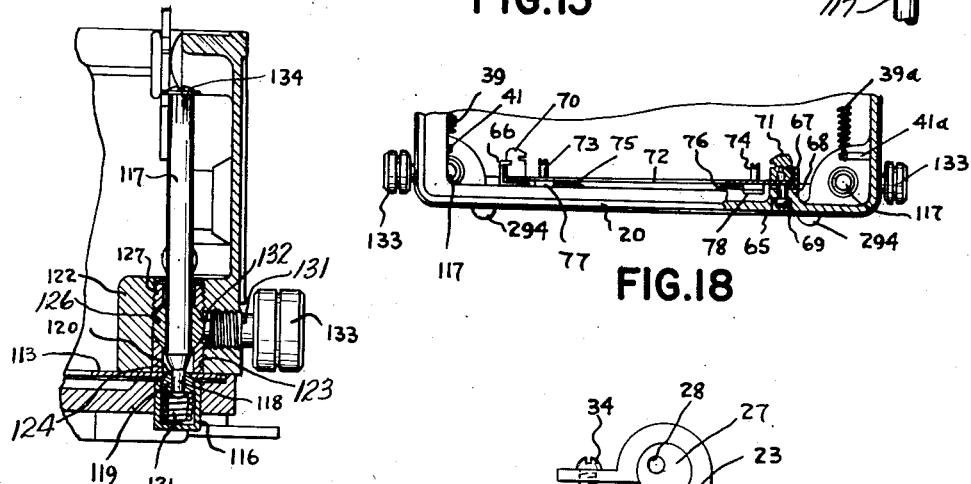
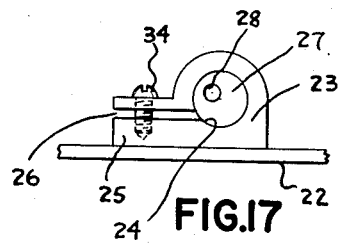
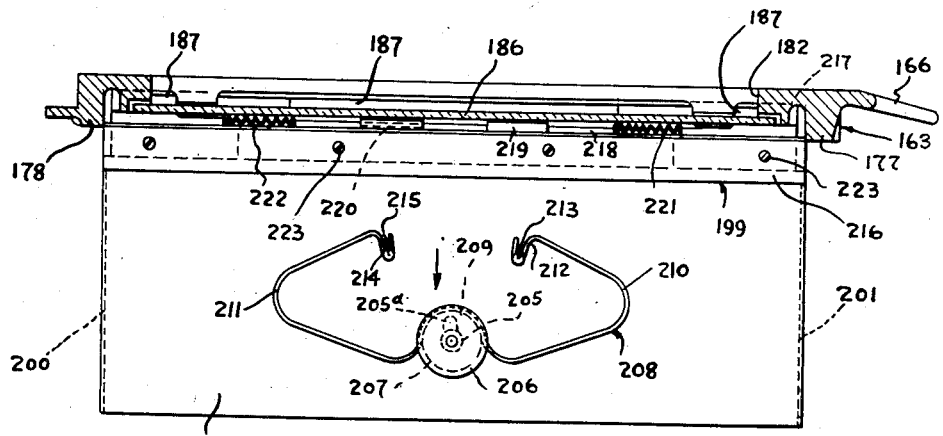
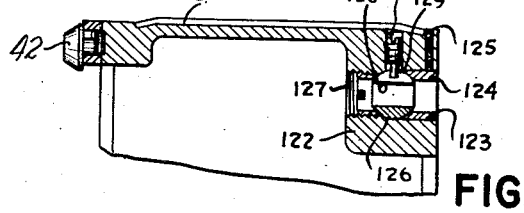

Patented Nov. 20, 1951

2,575,902

UNITED STATES PATENT OFFICE 2,575,902

AIR VENT AND FOCUSING SCREEN SUPPORT FOR BELLOWS TYPE CAMERAS

Victor Yager, Long Island City, and Jacob Woermann, Glendale, N. Y.

Application June 26, 1947, Serial No. 757,130

1 Claim. (Cl. 95—40)

This invention relates to improvements in cameras and more particularly to rigid metallic camera structures.

One of the principal objects of the invention is the provision in a camera having a bellows between the lens and the means for supporting light sensitive medium therein which includes novel means for allowing the air to enter the bellows when the lens is moved in a direction away from said light sensitive supporting means and which allows air to escape from the bellows when the lens is moved toward said light sensitive supporting means.

Another object of the invention is the provision in a camera of the character described of a round lens support adapted to be quickly placed in operative position on, or removed from the camera front plate. The round lens support adapts itself with greater facility to the forming of a light-trap between said support and the front plate of the camera, and may be secured thereto or disengaged therefrom by means of a single readily accessible knob.

Yet another object of the invention is the provision in a camera of the character described, of a discontinuous track which includes an accessory track and a bed track whereby the accessory track may be used with wide angle lenses, and the bed may be dropped when wide angle lenses are used.

Yet another object of the invention is the provision in a camera of the character described, of a ball and socket arrangement between the swing back adjusting rods and the casing of the camera, and means on said casing for clamping said rods in any adjusted position.

Another object of the invention is the provision in a camera, of a camera body, a drop bed hingedly connected thereto, link members pivotally connected to said bed, the connections therebetween including eccentric bushings for aligning said bed to exactly 90 degrees with the axis of the camera body, said eccentric bushings being free to be moved while the camera is being calibrated and being subsequently locked in the adjusted positions during said calibration, said links being adjustably connected to the camera body in a plurality of relations at least one of which positions said bed 90 degrees with respect to the vertical plane of the camera body.

Other objects and advantages of the invention will be apparent to those skilled in the art upon a study of the following specifications and the appended claim.

Referring now to the drawings which illustrate, by way of example, one embodiment of the invention:

Figure 1 is a side elevation partly broken away, of our new and improved camera showing novel features of the invention.

Figure 2 is an elevation of the camera shown in Figure 1, as seen from the right hand side of Figure 1;

Figure 3 is a plan view of the camera shown in Figures 1 and 2, with portions thereof broken away to show the structure and arrangement of some of my novel features;

Figure 4 is an elevation of the camera of Figures 1 and 2, as seen from the left side of Figure 1;

Figure 5 is a sectional elevation of the camera as seen along the lines 5—5 of Figure 4, and showing the arrangement for allowing air to enter or leave the bellows.

Figure 12 is a sectional elevation of the camera taken along the lines 12—12 of Figure 2;

Figure 13 is a rear elevation of the revolving back of the camera with the plate or film pack holder retaining plate removed and showing the spring loaded registering dowels carried by said revolving back;

Figure 14 is an elevation of the opposite side of the revolving back and its support;

Figure 15 is an elevation partly in section taken along the lines 15—15 of Figure 13;

Figure 16 is an enlarged view partly in section showing the camera back supporting rod as seen along the lines 16—16 of Figure 3;

Figure 17 is an enlarged view of the bushing arrangement for leveling the camera bed with the camera body;

Figure 18 is an elevation, partly in section, taken along the lines 18—18 of Figure 1;

Figure 19 is a sectional view taken along the lines 19—19, of Figure 10, and showing the method of retaining the split ball in the body of the camera.

Figure 20 is a fragmentary view taken along the lines 20—20 of Figure 4, and showing details of the spring back and the focusing hood.

Figure 6:
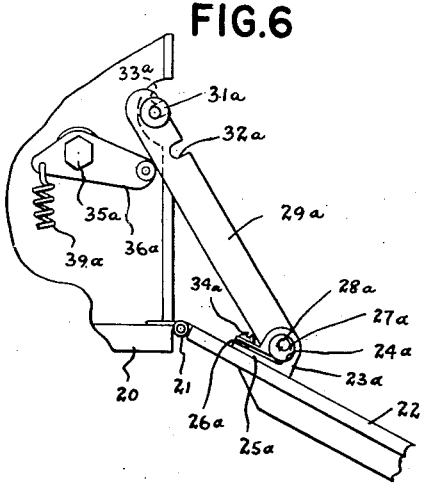
Figure 6 is a fragmentary view showing one of the link members and the arrangements between it and the camera body entering one end thereof and between it and the drop bed at the other end thereof.

Referring first to Fig. 1, the camera has a box-like frame or body 20 carrying a hinge 21 to which the camera bed 22 is connected. Secured to the camera bed, on one side thereof, is a lug 23 which has a hole 24 formed therein. The lug 23 has an extended portion 25 which has a slot 26 formed therein parallel to the base of the lug and communicating with the hole 24.

Positioned in the hole 24 is a bushing 27 which has an eccentric hole 28 formed therein. A side arm 29 has a threaded hole therein which is engaged by a shouldered screw 30 positioned in the hole 28 (Figures 1 and 17).

Positioned inside the casing 20 and on the left wall thereof, as seen in Figure 2, is a flanged stud 31 which is adapted to be engaged by a notch 32 formed in the side arm 29 when the camera bed is in a horizontal position and adapted to be engaged by a notch 33 in said side arm when the camera bed is in a dropped position.

A screw 34 passing through the extended portion of the lug 23 is adapted to secure the bushing 27 in the hole 24. In assembling the camera the screw 34 is loose and leaves the bushing 27 free to turn in the hole 24 so that when the notch 32 engages the flanged stud 31, the camera bed 22 may be set square with the focal plane of the camera, and while so setting the bed the bushing 27 will rotate in the hole 24 to a position corresponding to the level bed, after which the screw 34 may be tightened to clamp the bushing 27 in the adjusted position and thereafter whenever the camera is opened and the bed swung down to a point where the notch 32 in the side arm 29 engages the boss 31, the bed will be square with the camera.

Figure 11:
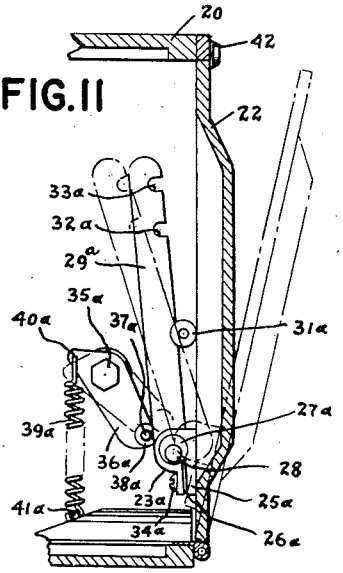
Figure 11 is a fragmentary sectional view of the camera showing a spring-loaded cantilever engaging the side arms, and tending to urge the camera bed outwardly from its closed position when the latter is released.

Pivotally mounted within the left wall of the camera casing 20 is a stud bearing 35, and journaled on this stud bearing is a lever 36. A roller 37 is carried on a stud 38 positioned near one end of the lever 36 and this roller is adapted to bear against the side arm 29 and thereby to urge the notch 32 into engagement with the stud 31 when the bed is to be level, or to urge the notch 33 into engagement with the stud 31 when the bed is to be dropped. In order to effect this urging, a spring 39 has one end connected to the lever 36 at the point 40, and has its other end connected to a stud 41 mounted in the side wall of the casing 20 adjacent to the lever 36. The spring 39, via the lever 36 and the side arm 29, also urges the camera bed upwardly from its closed position when the button 42 is moved upwardly, as seen in Figure 2, to release the bed in the manner shown in dot-dash lines, Figure 11.

Secured to the camera bed on the other side thereof is a corresponding lug 23a which cooperates with a corresponding side arm 29a and which includes duplicates of the elements above described, and since these elements are the same they are designated by the same numerals followed by the letter a.

Mounted on the bed 22 are stationary parallel rails 43 and 44. These rails are not only parallel to each other, but are parallel to the axis of the camera. A movable rail 45 has a side groove formed therein which is engaged by the rail 43, and a second movable rail 46 has a side groove formed therein engaging the rail 44. The movable rails 45 and 46 are joined together by a bridge member 47 on the front ends thereof, and are joined together on the rear ends thereof by a like bridge member 48 (which may be seen in Figure 12); thereby a rigid movable carriage is provided.

Supported on the stationary rail 43 is a clamping device 49 having a lever 50 by means of which the carriage may be clamped against movement. Secured to the lower face of the movable rail 45 is a rack 51 which may be seen in Figure 1. Likewise secured to the lower face of the movable rail 46 is a rack 52 which may be seen in Figure 12. Secured to the bed 22 by means of screws 53 adjacent to a notch 55 formed in the left edge of the bed 22, as seen in Figure 3, is a bearing 54. Also secured to the bed 22 by means of screws 56 adjacent to a notch 58 formed in the upright edge of the bed 22, is a bearing 57. Journaled in the bearings 54 and 57 is a shaft 59 which carries a pinion, not shown, but meshing with the rack 51, and a second pinion 60 which meshes with the rack 52. On the left end of the shaft 59, as seen in Figure 3, is a knurled knob 61, and on the right end of the shaft is a knurled knob 62 so that by turning either knob the movable carriage may be moved forward or backwards along the stationary rails 43 and 44. A bracket 63 secured to the bed 22 by means of screws, one of which is shown at 64, spans and protects the shaft 59.

When the movable carriage is moved toward the camera body a point is reached where the bridge member 47 contacts the bracket 63 and is stopped thereby. Likewise when the carriage is moved in a direction away from the camera body a point is reached where the bridge member 48 comes in contact with the bracket 63 and thereby the outward movement of the carriage is stopped.

Referring now to Figure 18, the auxiliary camera bed is mounted on the lower or bottom side 65 of the camera box 20 and includes stationary rails 66 and 67 in spaced parallel relation to each other with overhanging portions facing each other. These stationary rails may be secured to bosses such as the boss 68 by means of screws 69. A slidable rail 70 has a side groove therein which cooperates with the stationary rail 66, and a like slidable rail 71 has an outside groove formed therein which cooperates with the stationary rail 67. The rails 70 and 71 have a bridging plate 72 secured thereto to form a rigid slidable structure. The plate 72 also carries stop pins 73 and 74 to limit the extreme rearward movement of the lens carrying structure which will be presently described. A double-ended spring having arms 75 and 76 carry on their outer ends pressure shoes 77 and 78 respectively, and these pressure shoes bear against the lower surface of the plate 72 and tend to restrain the movement of this plate and the slidable rails which are movable therewith. The spring member is secured to the bottom side 65 of the camera by means of screws 79.

Positioned between the movable rails 45 and 46 of the carriage is a cross member 80 having a channel 81 formed therein. The channel member 80 has secured thereto on one end thereof a metallic plate 82 engaging a groove formed in the rail 45, and on the other end of the member 80 is secured a second metallic plate 83 which engages a groove formed in the movable rail member 46. Since these plates are longer than the width of the channel member 80, a substantial and rigid bearing is attained. Slidably mounted in the channel 81 is a base member 84 which has secured on one end thereof an upright member 85, and secured on the other end thereof a like upright member 86. The base member 84 has a longitudinal slot 87 formed therein, the length of which limits the lateral movement of the base member and, consequently the movement of the uprights 85 and 86, and other elements, to be presently described, supported thereby.

Extending vertically from the channel member 80 is a stud 88 which extends through the slot 87 and through a washer plate 89 which is positioned on top of the base member 84 and overhangs both edges thereof. Secured to the stud 88 is a lever 90 having a knob 91 on the outer end thereof. The stud 88 is threaded into the base member 84, and when the lever 90 is in its normal position the base member 84 is held against lateral movement due to the fact that the channel member 80, the base member 84, and the washer plate 89 are rigidly clamped together. However, when the lever 90 is turned in a clockwise direction, as seen in Figure 3, these members are no longer clamped, and the base member 84 may be moved laterally to any desired position, following which the lever 90 may be turned to clamp the members together and retain the adjustment.

Referring now to Figures 3 and 12, a lever 92 is pivotally mounted beneath the channel member 80 by means of a shouldered screw 93. This lever carries on its outer end a knob 94 and is linked to a plunger, not shown, which is adapted to bear against the movable rail 46. A second lever 95 is mounted beneath the channel member 80 in the same manner and in spaced relation to the lever 92. This lever carries a knob 96 and is linked to a second plunger, not shown, which is adapted to press against the rail 45. A spring 97 (Figure 12), has one end connected to the lever 92 and the other end connected to the lever 95, and is adapted to urge the plungers aforementioned into firm contact with the rails 46 and 45 respectively. When an operator grasps the knobs 94 and 96 and urges them toward each other, the plungers are released from engagement with the rails, and the channel member, and the other members supported thereby can be easily moved along on the rails 45 and 46.

Formed in the upright members 85 and 86 are aligned slots 85a and 86a respectively. Between the uprights is positioned a swingable front plate 98, and extending from the front plate through the slot 85a in the upright 85, is a stud 99 which carries on its outer threaded portion a short bar 100 which forms a locking nut. A washer 101 is positioned on the stud between the locking bar 100 and the upright 85. Likewise, a second stud 102, carried by the front plate 98, extends through the slot 86a in the upright 86, and positioned on the threaded portion thereof is a washer 103 and a locking bar 104. When the locking bars 100 and 104 are rotated to unclamp the front plate 98 it may be swung about the studs 99 and 102 as a gimbal and, when desired, the front plate 98 may be raised, in which event the studs 99 and 102, which form a working fit in the slots 85a and 86a, permit the front plate 98 to be raised to any desired level within the confines of the slots. When the front plate 98 is in a desired position the clamping bars 100 and 104 may be tightened to retain the plate in such position.

Positioned in the upright member 85, below the stud 99, is a thumb screw 105 which has a pointed end adapted to engage a socket formed in the flange of the front plate 98. Likewise positioned in the upright member 86, below the stud 102, is a second thumb screw 106 the point of which is adapted to engage a corresponding socket formed in the flange of the front plate 98.

Referring now to Figure 12, a bellows 107 has a flanged end portion 108 which is clamped between the front plate 98 and an inner plate 109 by means of screws 110. Between the end portion 108 and the front plate 98 is a felt or other non-metallic gasket 108a having an opening therein substantially the same diameter as the opening 109a in the inner plate 109. The other end 111, of the bellows, is clamped between an inner plate 112, and a plate 113 which is set into the camera back plate 114 and secured therein by means of screws engaging tapped holes 115 formed in the camera back plate 114 (see also Figures 14 and 15).

Referring now to Figures 13 and 14, the camera back plate 114 has adjacent to the four corners thereof individual cups 116 mounted in holes formed therein. The outer ends of these cups are closed, and positioned within each cup is the outer end 118 of the back tilt rod 117 (Figure 16). The outer end 118 of this rod is of reduced diameter and has secured thereon a ball 119 which is retained in position in the cup by means of a hole 120 formed in the plate 113 concentric with and smaller in diameter than the interior of the cup 116. A spring 121 within the cup 116 bears against the ball 119 and urges it against the seat 120 formed in the plate 113.

Figure 10:
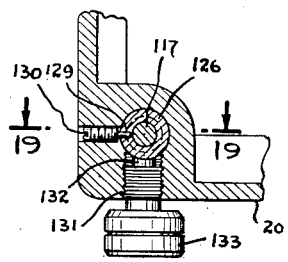
Figure 10 is a sectional view taken along the lines 10—10 of Figure 3, and showing how the camera back supporting rods may be locked into any adjusted position by means of a thumb screw engaging a split ball mounted on the supporting rod.

Formed within the camera body 29, adjacent to one corner thereof, is a boss 122 which has, as is best seen in Figure 16 and Figure 19, a hole 123 formed therein. Positioned within the hole 123 is a bushing 124 which is secured in the camera body by means of a set screw 125. The left end of the bushing 124 is rounded to form a portion of the socket for a hollow ball 126. Threadedly engaging the hole 123 from the left end, as seen in Figure 19, is a bushing 127, the inner end of which is also rounded to cooperate with the ball 126. The ball 126 has a hole 128 into which the rod 117 forms a working fit. The ball 126 has a longitudinal slot 129 formed therein and the point of a set screw 130 engages this slot to insure the proper orientation of the ball. Formed in the boss 122 with its axis at a right angle to the axis of the set screw 130, as may best be seen in Figures 10 and 16, is a clamping screw 131 having a tip 132 which engages the split ball 126, and when the knurled knob 133 on the end of this clamping screw is turned, to carry the screw 131 inwardly, the ball 126 is compressed due to the fact that it is split at 129 and thereby the rod 117 is clamped against movement; and due to this novel structure the surface of the rod 117 is not marred in any way.

There are corresponding bosses in the other four corners of the camera body 20 and each contains rods, balls, etc., which are duplicates of the one just described, and it is therefore believed that the description of the others need not be repeated.

Due to the ball arrangement the camera back, when the knobs 133 are turned to release the rod 117, may be tilted to any desired degree and is only limited by the lengths of the rod 117. In the end of each rod 117 is a screw 134, the head of which limits the movement of the rods 117 rearwardly, or to the left as seen in Figure 3, to a maximum point where the head of the screw 134 contacts the threaded bushing 127.

Referring now to Figures 12, 13, 14 and 15, the revolving back 135 is generally rectangular in form and has extending flanges 136, 137, 138, and 139, the outer peripheries of which are circular, and it has an opening 140 formed therein which is generally rectangular and of a larger cross sectional area than the area of the ground glass focusing screen to be presently described. The revolving back has its rear portion (the portion seen in Figure 13), a flat surface 141 bounded on one side by an upright web 142 and on the left end, as seen in Figure 13, by a web 143 which is preferably continuous with the web 142. Preferably formed integral with the web 143 is a web 144 which is parallel to the web 142. These webs form a socket into which a plate holder, film pack adapter, or cut film holder, may be positioned when a photograph is to be taken. A groove 145 formed in the surface 141 of the revolving back extends adjacent to the right edge of the opening 140 from the web 142 to the web 144, and is adapted to be engaged by a corresponding keying projection on the plate holder film pack adapter or cut film holder when positioned in the photographing position whereby such holder is rigidly locked into the socket formed by the upright webs 142, 143, and 144.

As may be seen in Figure 15, a hole 146 is formed in the web 144, and slidably mounted in this hole is a plunger 147 having a rounded end 148 which is adapted to engage registry holes formed in the camera back plate 114, one of said registry holes being shown and designated by the numeral 149. The plunger 147 is constantly urged toward the camera back plate 114 by means of a leaf spring 150, which is secured to the upper edge of the web 144 by means of screws 151. The web 142 carries a like plunger and spring, and the plunger is positioned diametrically opposite the plunger 147. Since these elements are identical they are given the same numerals, as may be seen in Figure 13. On the opposite side of the revolving back, as may be seen in Figures 14 and 15, an annular boss 152 is formed integral with the revolving back 135, and this boss extends into a corresponding hole 153 formed in the camera back plate 114. The annular boss 152 has a depressed portion 154 which is curved in form, as may be seen in Figure 14. Threadedly engaging a hole formed in the depressed portion 154 is a screw 155, and a metal strip 156 embraces and lies upon the outer surface of the annular boss 152. This metallic strip has holes formed near each end thereof, and the screw 155 passes through said holes so that when the screw 155 is screwed into its threaded hole, its head (which is preferably a filister head) forces the ends of the metallic strip between the depressed portion 154 and thereby the portion of the metallic strip in contact with the annular boss 152 is tightened so that the metallic strip moves with the revolving back.

Since the back plate 114 and the revolving back 135 are made of non-ferrous metals, the provision of the thin metallic strip, which in the present instance is preferably made of stainless steel, and since the metallic strip is tightly embracing the boss 152, the surface of the stainless steel strip forms a bearing with the surface of the hole 153 formed in the back 114, therefore, by the use of dissimilar metals we obtain a smooth and perfect bearing.

Before the revolving back is mounted with the boss 152 and the strip 156 thereon, engaging the surfaces of the hole 153, a seating strip 157 is preferably cemented to the surface of the back plate 114 adjacent to the hole 153 therein, so that the flange portion 158 of the revolving back is cushioned thereon with a light-tight seal. After the revolving plate is assembled on to the back plate 114 with the boss and the embracing stainless steel strip 156 bearing in the hole 153 and the flange portion 158 bearing on the seating strip 157, the revolving back is secured thereon by means of a plurality of screws 159 and washers 160. There is a washer on each screw and the diameter of the washer is such that it overlaps the back plate 114 as each screw 159 is screwed into a corresponding threaded hole formed in the boss 152. In the embodiment herein shown and described we employ 12 such screws and washers, but this is merely given by way of example, as we can use as many as are deemed necessary.

The plate 113 was previously described as set into the back plate 114. This plate is set into a rectangular depression 161 with a sealing strip 162 therebetween. The sealing strip 162 and the seating strip 157 are preferably made of a non-metallic material and in the example given these strips are preferably made of felt.

Referring now to Figures 1, 3, 4, 5, 12, and 20, the spring back 163 includes a rectangular frame 164 having on one end thereof extended webs or tabs 165 and 166 which are curved outwardly as shown in Figure 20 to facilitate the insertion of a holder for the light sensitive medium. The spring 163 is normally positioned in contact with the surface 141 of the revolving back, and is bounded by the sides 144, 143, and 150. The spring back has a filister head screw 167 extending laterally from one corner thereof, and in alignment therewith with the other corner on the same side is a second filister head screw 168. On the opposite side of the spring back 163 is a filister head screw 169 which is preferably in axial alignment with the screw 167 and a second screw 170 which is preferably in alignment with the screw 168. These screws are mounted in corresponding threaded holes formed in the rectangular frame. A spring 171, best seen in Figure 3, has a loop 172 formed on one end thereof embracing the shank of the screw 167. This loop, as may be seen in Figure 3, is normally spaced apart from the screw 167. The spring 171 has a loop 173 formed on the other end thereof embracing the shank of the screw 168. The reason for providing a space between the loop 172 and the shank of the screw 167 is that when a holder is inserted between the swinging back and the revolving back the space between the loop and the shank of the screw is decreased to a point where the loop just clears the screw 167 without binding. Overlying the spring 171 is a reinforcing spring 174. The springs 171 and 174 have spaced holes formed therein intermediate the ends thereof through which screws 175 extend and threadedly engage holes 176 formed in the web 142 of the revolving back (see Figure 13). The screws 169 and 170 have associated therewith springs 171 and 174 which are identical with the ones just described, and the description need not here be repeated. These springs are designated by the same numerals, namely 171 and 174 respectively, and they are secured to the web 144 on the revolving back by means of screws 175 engaging tapped holes 176 formed in said web.

The rectangular frame 164 of the swing back 163 has upright webs 177 and 178 at opposite ends thereof and upright webs 179 and 180 on opposite sides thereof leaving therebetween a flat surface 181, and the following describes one very important feature of the invention.

Formed within the rectangular frame 164, and terminating in the surface 181 is a rectangular opening 182 which forms a frame. Although the corners of the opening 182 are shown rounded as at 183, for example, it is obvious that the corners can be square, or any other desired shape without departing from the spirit of the invention.

Formed integral with the frame 164 and extending rearwardly from the surface 181, is a plurality of bosses 184. The bosses 184 have portions thereof machined off to form flat surfaces or seats 185 which are spaced apart from the surface 181. These seats form supports for the ground glass focusing screen 186, and when the focusing screen 186 is positioned on the seats or surfaces 185, there is a space 187 between the inner surface of the ground glass screw 186 and the surface 181 except where the bosses 184 appear. The upstanding portions of the bosses 184 serve to back up the edges of the focusing screen and prevent it from moving in either direction.

The space 187 between the focusing screen 186 and the surface 181 provides space for air to enter or leave the bellows when the front standard carrying the lens is moved forward or backward on the carriage. For retaining the ground glass focusing screen 186 in position on the seats 185, oppositely disposed spring members 188 are provided. Each spring member consists of a straight portion 189, and angular end portions 190 and 191 are formed integral therewith. The portion 190 has a spring extension 192 with an eye on the end thereof through which a securing screw 193 passes and engages the rectangular frame 164. Formed integral with the portion 191 is a spring extension 194 which terminates in a loop through which a screw 195 passes to secure it to the frame 164. Since these holddown members are identical only one of them need be described, and they are oppositely disposed to engage opposite ends of the focusing screen. The straight portions 189 overlie the glass screen and when it is desired to remove the screen the straight portion of either one of the spring members may be lifted to disengage one end of the glass screen and permit it to be removed.

The spring back also carries a focusing screen which includes a rigid rectangular member 196 secured to the web 180 by means of a hinge 197. A second rigid rectangular member 198 is secured to the web 179 by means of a hinge 199. The hinges 197 and 199 are identical and since the details of the hinge 199 are shown in Figure 20, it is believed that a description of this hinge would suffice for both of them. The hinge 199 consists of a member 216, and a member 217 with interlocking eye portions 218 and 219 respectively embracing a hinge pin 220. Eye portions are omitted to accommodate springs 221 and 222. The springs 221 and 222 embrace the hinge pin 220 and have projecting ends which lie flat against the portions 216 and 217 and tend to urge the rigid rectangular member 198 to which the portion 216 is secured by means of screws 223, to an open position. Therefore, when the rectangular member 198 is moved to the closed position it is moved against the urge of these springs. A flexible rectangular member 200 joins the rigid members 196 and 198 and is secured to the web 178. A second flexible rectangular member 201 is secured to the web 177 and to the rigid rectangular members 196 and 198. The flexible members 200 and 201 may be made of fabric, leather, plastic or any other flexible material. Preferably these flexible members are pre-creased, as indicated by dotted lines in Figure 12 and designated by the numerals 202 and 203 so that as the members 198 and 196 respectively are folded down flat to close the focusing hood, the flexible members 200 and 201 fold flat underneath the rigid members 198 and 196 along the lines 202 and 203.

In order to retain the rigid members 198 and 196 (Figure 12) in the closed position, a catch button 204 is provided. This catch button includes a shank portion 205 which is limitedly slidable in a corresponding hole 205a formed in the rigid member 198. Secured to the catch hole 204 on the opposite face of the rigid member 198, is a washer 206 having a groove 207 formed in the rim thereof. A spring 208 has a mid portion 209 which engages the groove 207, and has U-shaped legs 210 and 211 formed integral therewith. On the end of the leg 210 is a hook portion 212 which engages a grooved boss 213 mounted on the rectangular member 198; likewise the outer end of the portion 211 has a hook portion 214 which engages a grooved boss 215 which is mounted on the member 198 in spaced relation to the boss 213. The spring 208 constantly urges the washer 206 and, consequently, the button 204 in the direction of the arrow. Since the button 204 has a beveled rim 204a the outer edge 196a of the rigid rectangular member 196 engages this beveled edge when the rigid members 198 and 196 respectively are folded down to close the focusing hood and, thereby, the button 204 is cammed against the urge of the spring 208, and as soon as the edge 196a passes the rim 204a and is in flat contact with the rectangular member 198, the button 204, under the urge of the spring 208, moves back to a position where the rim 204a overlies the edge 196a and thus the focusing hood is locked in the closed position. The operator may open the focusing hood by manually moving the button 204 against the urge of the spring 208, and the focusing hood immediately snaps to the open position shown in Figure 12, due to the urge of the springs in the hinges 197 and 199.

Referring now to Figures 2 and 12, the front plate 98 has a hole 224 formed therein and this hole is larger in diameter than the hole 109a and, therefore, a portion of the gasket 108a is uncovered. Communicating with the hole 224 is a counterbored hole 225.

A round lens board, generally designated by the numeral 226, has a hole 227 therein to accommodate a lens or a shutter carrying a lens. In Figure 12 the lens board is shown without any lens mounted in the hole 227, while in Figure 2, a shutter 228, carrying a lens 229, is shown. The lens board differs from lens boards heretofore employed, in two ways: (a) it is not a board at all; and, (b) instead of being square, or rectangular, it is round. On the rear face of the lens board 226 is a boss 230 which forms a working fit in the hole 224. This leaves the remainder of the lens board thin, and adapted to lie in the counterbore portion 225. The front of the lens board 226 has a narrow surface 231 which is slightly below the outer surface of the lens board 226, thereby making the thin flange portion which lies in the counterbore 225, of a predetermined thickness. When the lens board is in position, with its boss portion in the hole 224, the inner face of the boss 230 is in contact with the portion of the gasket 108a (which was previously described as uncovered), and forms a light tight joint. This light tight joint, together with the light trapping effect of the counterbored or spaced holes, produces a joint which will not allow any light whatever to pass therethrough.

Figure 7:
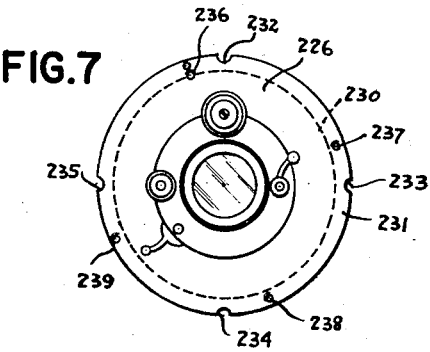
Figure 7 is an elevation of the round lens support with a lens carried thereon.

The lens board 226, referring to Figure 7, has semi-circular notches 232, 233, 234, and 235 formed therein. These notches are disposed in the portion 231 and are preferably 90 degrees apart. Spaced apart from the notch 232 is a depression 236. Correspondingly adjacent to the notches 233, 234, and 235, respectively are other depressions 237, 238, and 239.

Referring now to Figure 2, the lens board is shown in position on the front plate 98 and is retained thereon in a novel manner which permits almost instant removal and/or replacement of the lens board.

Figure 8:
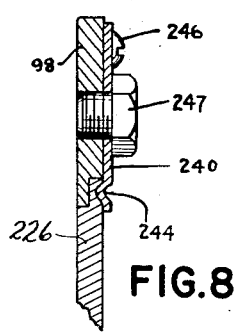
Figure 8 is a sectional view as seen along the lines 8—8 of Figure 2 and showing the arrangement for supporting spring indexing clips on the front plate of the camera for holding the round lens support thereon and yet permitting it to be readily removed therefrom.
Figure 9:
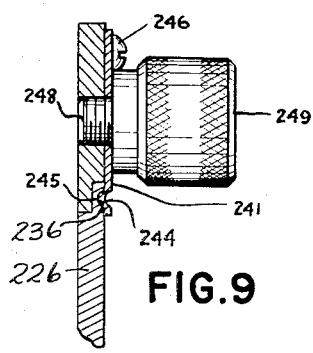
Figure 9 is a sectional view as seen along the lines 9—9 of Figure 2 and this view shows substantially the same kind of spring clips as those shown in Figure 8 with the exception that the one shown in Figure 9 is manually adjustable, and constitutes the operator's means for detachably securing the round lens support on the front plate of the camera.

Mounted on the front plate 98 and having tips overlying the counterbore 225, are spring members 240, 241, 242, and 243. The spring members are all identical, and carry in their tips depressions 244, as may be seen in Figures 8 and 9, which provide round nosed projections 245 on the undersides thereof. These round nosed projections are adapted to engage the depressions 236, 237, 238, and 239, formed in the lens board 226. Each spring member is secured to the front plate 98 by means of a pair of spaced screws 246 adjacent to the outer edges thereof, and the spring members 240, 242, and 243 may be tensioned by means of hexagon head screws 247. The screws 247 may be set to pre-tension the spring members 240 and 242, and 243, and once having been set no further adjustment thereof is necessary. The spring member 241 is tensioned by means of a screw 248 having a thumb knob 249 formed integral therewith. In removing the lens board the screw 248 is loosened by turning the knob 249 and releasing the tension on the spring member 241. Following this the shutter may be grasped (referring to Figure 2) and the lens board is rotated in a counter-clockwise direction until the notches 232, 233, 234, and 235, are in alignment with the axes of the spring members 240, 241, 242, and 243 respectively. Since the notches are larger than the overhanging tips of the spring members the lens board may be freely removed from the front plate 98. Now in replacing the lens board, or another identical lens board (carrying a different type of lens, perhaps), the lens board is moved into engagement with the counterbore 225 with the notches so positioned that they clear the tips of the spring members until the flange portion of the lens board is within the counterbore 225, then the lens board is rotated in a clockwise direction until the rounded under projections on the spring members respectively engage the depressions 236, 237, and 239, following which the thumb screw 249 may be tightened and the lens board is firmly mounted on the front plate 98 with a perfect light tight joint. Mounted on the top flange of the front plate 98 by means of screws 251, is a bracket 250 (see Figures 1 and 12). The bracket 250 carries a channel member 252 upon the ends of which are mounted round end plates 253 and 254. Within the channel 252 is a leaf spring 255 which bears against a square bar 256. A wire finder 257 has a portion 258 bearing in the end plate 254 and secured to the square bar 256. The wire finder also has a portion 259 bearing in the end plate 253 and connected to the square bar 256. The wire finder has vertical sides 260 and 261, a horizontal top portion 262, and a horizontal bottom portion 263 from which the portions 258 and 259 are offset. The spring 255 bearing against the square bar 256 holds the wire finder in the upright position shown in Figure 2, and when the wire finder is swung in a clockwise direction as seen in Figure 1, and is extending vertically downward, the spring 255 bearing against the square bar 256, maintains it in this position.

Mounted on the top of the camera body 20 is a peep sight 265 which includes a bracket 264 secured to the camera top by means of screws 266. A pivot pin 267 (see Figure 12) has secured thereto an upright plate 268, the lower end 269 of which partially embraces and is secured to the pin 267. When the plate 268 is vertical the portion 269 is horizontal. Positioned within the bracket 264 is a spring 270 which bears upwardly against the flat surface of the portion 269. Mounted on the upper end of the plate 268 is a sight plate 271 having a rectangular opening 272 formed therein so that when the peep sight and the wire finder are in the positions shown in Figure 12, the operator may look through the opening 272 and see within the boundaries of the wire finder the subject to be photographed. When not in use, the peep sight may be folded down against the flat surface of the camera body (in a clockwise direction as seen in Figure 12) until a point is reached where the spring 270 bears against the end of the portion 269 and thereby the peep sight is retained flat against the camera body.

Referring now to Figure 3, a stop 273 straddles the movable rail 45 and is secured thereto by means of screws 274. A like stop 275 straddles the rail 46 and is secured thereto by means of screws 276. Secured to the stop 275 by means of a screw 277, intermediate the screws 276, is a plate 278 carrying a pointer 279, and this pointer cooperates with a scale 280 mounted on the camera bed so that the camera may be set by rotating the focusing knobs 61 or 62 for subjects known distances away from the lens of the camera.

A carrying handle 281 is formed of a leather strip having straight overlapping portions 282, 283, and 284. Between the portions 282 and 283 is a loop 285, and between the portions 282 and 284 is a loop 286. The loop 285 engages a ring member 287 and this ring member is in turn engaged by a bracket 288 secured to the side of the camera body. A ring member 289 is engaged by the loop 286 and is also engaged with a snap hook 290 mounted on the bottom of the camera body 20. The hook member 290, as may be seen in Figures 1 and 4, is secured to the bottom of the camera body by means of screws 291.

A boss (Figure 5) 292, formed in the lower surface of the camera body 20, has a tapped hole 293 formed therein, and this threaded hole is adapted to be engaged by a screw in a tripod when it is desired to mount the camera on a tripod. The camera body also carries on the lower surface thereof a plurality of feet 294 which may be formed of rubber or the like, set into suitable holes formed in the base of the camera body 20. The drop bed 22 has a depression 295 formed therein, and the outer boundary 296 of this depression is in the form of a ring or circular band, which forms part of the trim when the camera is closed. In connection with the trim, all corners and edges of the outer surfaces of the camera are set above the surfaces upon which the leather or other non-metallic trim is mounted. For example, in Figure 1, the edges 297 and 298 show the metal of which the camera body 20 is formed. The surfaces of these edges are substantially flush with the surface of the trim 299. Another example is in connection with the metallic knobs 133. Looking at these knobs endwise, as in Figure 1, a metallic band 300 bounds a depressed portion in which the leather trim 301 is mounted, and this trim is substantially level with the surface of the band 300. This is important in view of the fact that the leather, or other trim material, is subject to wear, in use, and by leaving the corners and portions of the camera which receive the greatest contact wear, uncovered by the leather or the like, the metal receives the brunt of the wear and is capable of withstanding such wear.

The above described camera is sturdy, yet light. It is easy to handle and is extremely flexible, and is particularly adapted to what is believed to be a greater variety of different applications than any other camera we know of.

Although we have herein described and shown by way of example one embodiment of our new and improved camera, it is obvious that many changes may be made in the arrangements shown and described without departing from the spirit of the invention as defined in the following claim.

What is claimed is:

In a camera, a body, a back plate on said body, a bed hingedly connected to said body, a lens support movable along said bed, a bellows between said lens support and said back plate, a generally rectangular opening formed in said back plate, a plurality of supporting bosses disposed in spaced relation about all sides of said opening, each of said bosses being stepped to provide on each boss a supporting step and an overhanging step, said supporting steps being on a common level, a rectangular focusing screen supported on said steps and confined against lateral movement in either direction on the plane of said steps by said overhanging steps, and spring means oppositely disposed on said back plate engaging said screen and retaining it on said supporting steps, the spaces between said bosses and the edges of said back plate and said screen defining areas through which air may pass laterally into and from said bellows as said lens is moved along said bed.

VICTOR YAGER.
JACOB WOERMANN.

REFERENCES CITED

The following references are of record in the file of this patent:

UNITED STATES PATENTS

| Number | Name | Date |
|---|---|---|
| 169,702 | Howson | Nov. 9, 1875 |
| 283,589 | Flammang | Aug. 21, 1883 |
| 307,965 | Lewis | Nov. 11, 1884 |
| 342,212 | Lewis | May 18, 1886 |
| 712,302 | Hutchings | Oct. 28, 1902 |
| 716,108 | Robertson et al. | Dec. 16, 1902 |
| 736,214 | Case | Aug. 11, 1903 |
| 755,680 | Locke | Mar. 29, 1904 |
| 862,883 | Conley | Aug. 13, 1907 |
| 883,895 | Leighly | Apr. 7, 1908 |
| 900,526 | Hall | Oct. 6, 1908 |
| 1,001,386 | Goddard | Aug. 22, 1911 |
| 1,060,748 | Folmer | May 6, 1913 |
| 1,219,801 | Bornmann | Mar. 20, 1917 |
| 1,356,595 | Bordigon | Oct. 26, 1920 |
| 1,833,459 | Green | Nov. 24, 1931 |
| 1,885,286 | Petit et al. | Nov. 1, 1932 |
| 1,937,057 | Dieke et al. | Nov. 28, 1933 |
| 1,984,544 | Pearlman | Dec. 18, 1934 |
| 2,005,417 | Fuerst | June 17, 1935 |
| 2,017,823 | Taylor | Oct. 15, 1935 |
| 2,136,149 | Nuchterlein | Nov. 8, 1938 |
| 2,233,352 | Steiner | Feb. 25, 1941 |
| 2,260,991 | Gorey | Oct. 28, 1941 |
| 2,264,777 | Steiner | Dec. 2, 1941 |
| 2,326,025 | Gillon et al. | Aug. 3, 1943 |

FOREIGN PATENTS

| Number | Country | Date |
|---|---|---|
| 372,380 | Germany | May 24, 1932 |